United States Patent
Seo

(10) Patent No.: US 9,635,618 B2
(45) Date of Patent: Apr. 25, 2017

(54) METHOD FOR SETTING DOWNLINK TRANSMISSION POWER IN WIRELESS ACCESS SYSTEM, AND APPARATUS THEREFOR

(71) Applicant: LG ELECTRONICS INC., Seoul (KR)

(72) Inventor: Hanbyul Seo, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 190 days.

(21) Appl. No.: 14/362,372

(22) PCT Filed: Dec. 28, 2012

(86) PCT No.: PCT/KR2012/011731
§ 371 (c)(1),
(2) Date: Jun. 2, 2014

(87) PCT Pub. No.: WO2013/103219
PCT Pub. Date: Jul. 11, 2013

(65) Prior Publication Data
US 2014/0341093 A1    Nov. 20, 2014

Related U.S. Application Data

(60) Provisional application No. 61/582,801, filed on Jan. 3, 2012.

(51) Int. Cl.
*H04W 52/14* (2009.01)
*H04W 52/24* (2009.01)
(Continued)

(52) U.S. Cl.
CPC ........ *H04W 52/143* (2013.01); *H04B 7/2643* (2013.01); *H04W 72/042* (2013.01); *H04W 52/243* (2013.01); *H04W 88/08* (2013.01)

(58) Field of Classification Search
CPC . H04L 5/0048; H04L 25/0206; H04L 5/0094; H04L 5/005; H04L 25/03343;
(Continued)

(56) References Cited

U.S. PATENT DOCUMENTS

2011/0002285 A1* 1/2011 Kim ...................... H04L 5/0007
370/329
2011/0274205 A1 11/2011 Lee et al.
(Continued)

FOREIGN PATENT DOCUMENTS

KR    10-2010-0088518 A    8/2010
KR    10-2010-0139054 A    12/2010
(Continued)

*Primary Examiner* — Redentor Pasia
*Assistant Examiner* — Peter Mak
(74) *Attorney, Agent, or Firm* — Birch, Stewart, Kolasch & Birch, LLP

(57) ABSTRACT

Disclosed are a method for setting downlink transmission power in a wireless access system supporting an environment in which an amount of uplink resources and an amount of downlink resources dynamically change, and an apparatus therefore. Specifically, the method comprises the steps of: classifying resources to be used for downlink transmission into a plurality of sets; setting downlink transmission power to be different for each of the plurality of classified sets; and transmitting a downlink signal by using the set downlink transmission power.

8 Claims, 8 Drawing Sheets

(51) Int. Cl.
*H04W 72/04* (2009.01)
*H04W 88/08* (2009.01)
*H04B 7/26* (2006.01)

(58) Field of Classification Search
CPC ............... H04B 7/0632; H04B 7/0486; H04W 72/0446; H04W 88/02; H04W 48/10; H04W 72/0453; H04W 72/042; H04W 28/048; H04W 72/0406; H04W 4/005; H04W 72/0413
See application file for complete search history.

(56) References Cited

U.S. PATENT DOCUMENTS

| | | | |
|---|---|---|---|
| 2013/0058287 A1 | 3/2013 | Wang et al. | |
| 2013/0114517 A1* | 5/2013 | Blankenship | H04L 5/0053 370/329 |
| 2014/0233439 A1* | 8/2014 | Hong | H04W 72/1221 370/280 |

FOREIGN PATENT DOCUMENTS

| | | |
|---|---|---|
| KR | 10-2011-0002586 A | 1/2011 |
| KR | 10-2011-0092604 A | 8/2011 |

* cited by examiner

FIG. 6
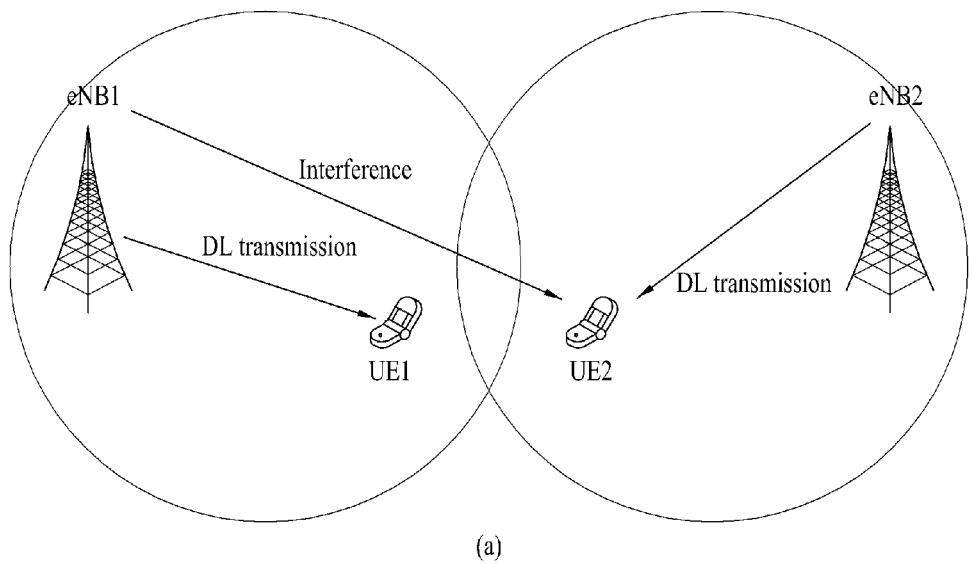
(a)
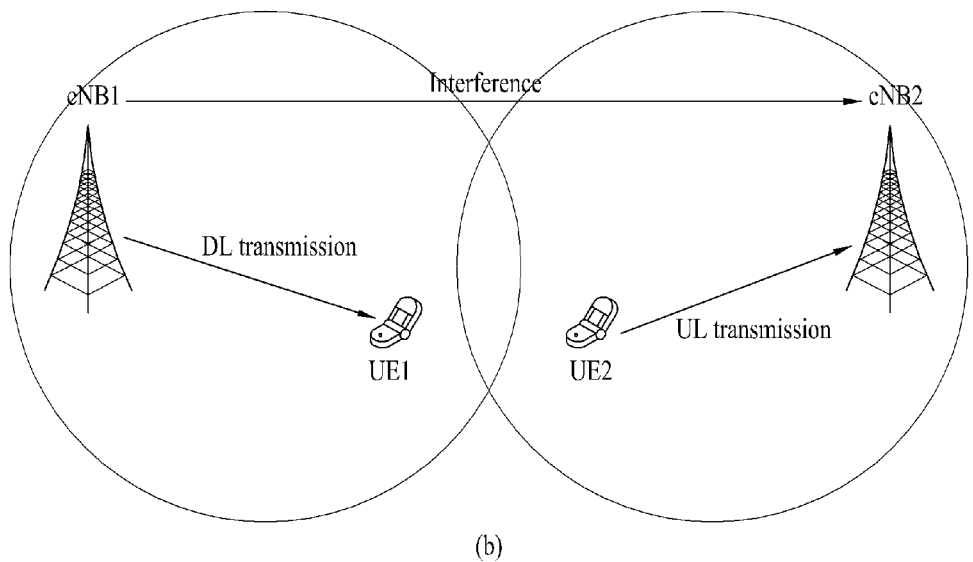
(b)

METHOD FOR SETTING DOWNLINK TRANSMISSION POWER IN WIRELESS ACCESS SYSTEM, AND APPARATUS THEREFOR

CROSS REFERENCE TO RELATED APPLICATIONS

This application is the National Phase of PCT/KR2012/011731 filed on Dec. 28, 2012, which claims priority under 35 U.S.C. 119(e) to U.S. Provisional Application No. 61/582,801 filed on Jan. 3, 2012, all of which are incorporated by reference herein in its entirety.

TECHNICAL FIELD

Embodiments of the present invention relate to a wireless access system, and more particularly to a method for configuring downlink transmit (Tx) power in a wireless access system supporting an environment in which the amount of uplink (UL) resources and the amount of downlink (DL) resources are dynamically changed, and an apparatus for supporting the method.

BACKGROUND ART

A mobile communication system has been developed in order to provide a voice service while ensuring user activity. The mobile communication system has been gradually extended to a data service in addition to the voice service and has currently developed to the extent of providing a high-speed data service. However, in a mobile communication system which currently provides a service, an improved mobile communication system has been required due to resource lack or user demand for higher-speed service.

The most important requirement of a next-generation wireless access system is to support a high data transfer rate. To achieve this, various technologies such as Multiple Input Multiple Output (MIMO), Cooperative Multiple Point Transmission (CoMP), relay, etc. have been developed and studied.

Although uplink (UL) resources and downlink (DL) resources are fixed in the conventional wireless access system and UL and DL traffics are changed, these UL and DL traffics are processed with limited resources. However, considering the environment in which a base station (BS) dynamically changes the amount of UL resources and the amount of DL resources according to the amount of UL traffic and the amount of DL traffic, UL resources may be used as DL resources as necessary, and DL resources may also be used as UL resources as necessary. In addition, if a TDD system considers the environment in which uplink/downlink (UL/DL) configuration is dynamically designated per contiguous cell, different subframe patterns (UL-DL configuration) may be used among contiguous cells. Under this situation, it is necessary for the BS and UE to properly use UL or DL resources according to usages of the corresponding resources.

DISCLOSURE

Technical Problem

An object of the present invention is to provide a wireless access system, and more particularly to a method and apparatus for enabling a base station (BS) to properly configure DL transmit (Tx) power in a wireless access system configured to support an environment in which the amount of UL resources and the amount of DL resources are dynamically changed.

Another object of the present invention is to provide a wireless access system, and more particularly to a method and apparatus for adjusting DL transmit (Tx) power so as to minimize inter-cell interference in a wireless access system supporting an environment in which the amount of UL resources and the amount of DL resources are dynamically changed.

It is to be understood that technical objects to be achieved by the present invention are not limited to the aforementioned technical objects and other technical objects which are not mentioned herein will be apparent from the following description to one of ordinary skill in the art to which the present invention pertains

Technical Solution

The object of the present invention can be achieved by providing a method for configuring downlink transmit power by a base station (BS) in a wireless access system supporting an environment in which the amount of uplink (UL) resources and the amount of downlink (DL) resources are dynamically changed, the method including: classifying a resource to be used for downlink transmission into a plurality of aggregates; configuring different downlink transmit (Tx) powers of the individual classified aggregates; and transmitting a downlink signal at the configured downlink transmit power.

In accordance with another aspect of the present invention, a base station (BS) for configuring downlink transmit (Tx) power in a wireless access system supporting an environment in which the amount of uplink (UL) resources and the amount of downlink (DL) resources are dynamically changed includes: a radio frequency (RF) unit configured to transmit/receive a radio frequency (RF) signal; and a processor configured to classify a resource to be used for downlink transmission into a plurality of aggregates, configure different downlink transmit (Tx) powers of the individual classified aggregates, and transmit a downlink signal at the configured downlink transmit power.

Alternatively or additionally, the resource used for downlink transmission may be classified according to whether a neighbor base station (BS) uses the resource for a purpose of uplink or downlink transmission.

The resource used for downlink transmission may be classified according to whether a downlink resource configured by a resource regulation of the base station (BS) is decided, or according to whether an uplink resource used for downlink transmission from among uplink resources configured by a resource regulation of the base station (BS) is decided.

The method may further include: transmitting information, that includes at least one of an indicator indicating a usage of each resource, transmit (Tx) power level information used by each resource, and maximum transmit (Tx) level information available in each resource, to a neighbor base station (BS).

The transmit (Tx) power level information used in each resource may be comprised of different Relative Narrow band Transmission Power (RNTP) indicators and different RNTP threshold values for the individual classified aggregates.

If the resource used for downlink transmission is classified into a resource specified for downlink and a resource specified for uplink, downlink transmit (Tx) power of the resource specified for downlink may be proportional to a power level of a common reference signal (CRS) transmitted from a neighbor base station (BS), wherein the resource specified for downlink is any one of a downlink resource configured by a resource regulation of the base station (BS), a downlink resource configured by a resource regulation of the neighbor base station (BS), a downlink resource configured by a network including the base station, and a subframe commonly specified for downlink on Time Division Duplex (TDD) uplink/downlink (UL/DL) configuration.

Downlink transmit (Tx) power of the resource specified for uplink may be configured by assigning an offset to downlink transmit (Tx) power of the resource specified for downlink, and may be configured using different parameter values after a method for configuring downlink transmit (Tx) power of the resource specified for downlink is equally used.

Downlink transmit (Tx) power of the resource specified for uplink may be configured to be proportional to uplink interference measured at the resource specified for uplink.

Advantageous Effects

As is apparent from the above description, exemplary embodiments of the present invention can allow a base station (BS) to properly configure DL Tx power in a wireless access system supporting an environment in which the amount of UL resources and the amount of DL resources are dynamically changed.

The embodiments of the present invention can allow the BS to flexibly adjust DL Tx power of resources to be used for DL transmission in a wireless access system supporting an environment in which the amount of UL resources and the amount of DL resources are dynamically changed, such that inter-cell interference can be minimized.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 6 is a conceptual diagram illustrating inter-cell interference generated according to a transmission (Tx) direction of a contiguous cell when two contiguous cells are configured to use the same time and/or frequency resources.

BEST MODEL

Figure 1:
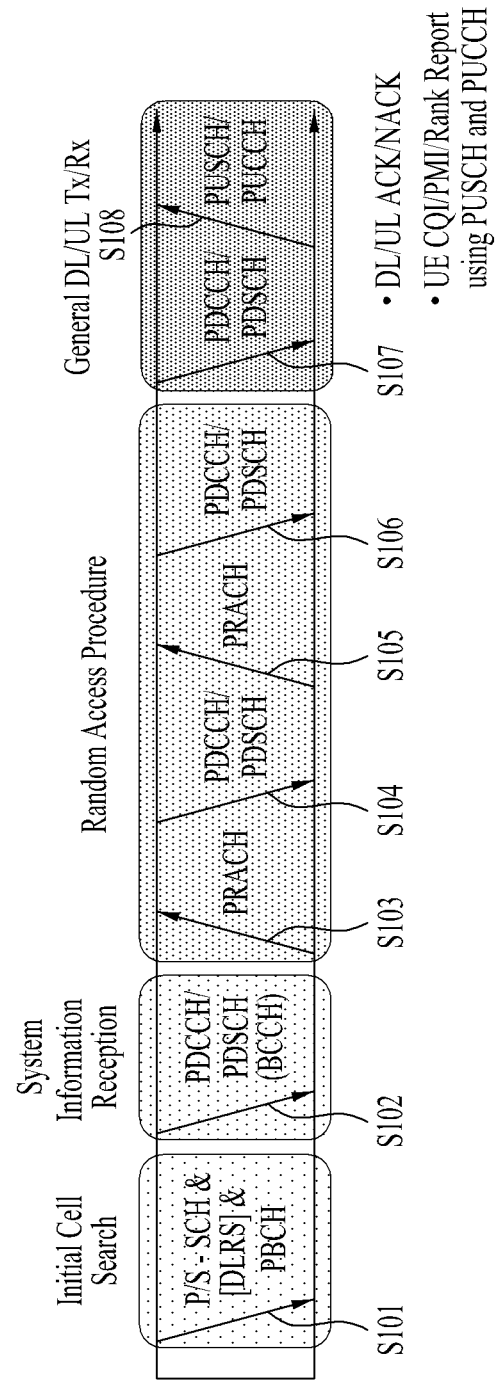
FIG. 1 is a conceptual diagram illustrating physical channels used in a 3GPP LTE system and a general method for transmitting a signal using the physical channels.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some cases, in order to prevent ambiguity of the concepts of the present invention, conventional devices or apparatuses well known to those skilled in the art will be omitted and denoted in the form of a block diagram on the basis of important functions of the present invention.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with the terms fixed station, Node-B, eNode-B (eNB), or an access point (AP) as necessary. The term "relay" may be replaced with a Relay Node (RN) or a Relay Station (RS). The term "terminal" may also be replaced with the terms User Equipment (UE), Mobile Station (MS), Mobile Subscriber Station (MSS), Subscriber Station (SS), Advanced Mobile Station (AMS), Wireless Terminal (WT), Machine-Type Communication (MTC) apparatus, Machine-to-Machine (M2M) apparatus or Device-to-Device (D2D) apparatus as necessary.

It should be noted that specific terms disclosed in the present invention are proposed for convenience of description and better understanding of the present invention, and the use of these specific terms may be changed to another format within the technical scope or spirit of the present invention.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

For clarity, the following description focuses on 3GPP LTE and 3GPP LTE-A. However, technical features of the present invention are not limited thereto.

1. Overview of 3GPP LTE/LTE-A Systems Applicable to the Present Invention 1.1 Overview of System FIG. 1 is a conceptual diagram illustrating physical channels for use in a 3GPP system and a general method for transmitting a signal using the physical channels.

Referring to FIG. 1, when powered on or when entering a new cell, a UE performs initial cell search in step S101. The initial cell search involves synchronization with a BS. Specifically, the UE synchronizes with the BS and acquires a cell Identifier (ID) and other information by receiving a Primary Synchronization Channel (P-SCH) and a Secondary Synchronization Channel (S-SCH) from the BS.

Then the UE may acquire information broadcast in the cell by receiving a Physical Broadcast Channel (PBCH) from the BS. During initial cell search, the UE may monitor a downlink channel status by receiving a downlink Reference Signal (DL RS).

After initial cell search, the UE may acquire more specific system information by receiving a Physical Downlink Control Channel (PDCCH) and receiving a Physical Downlink Shared Channel (PDSCH) based on information of the PDCCH in step S102.

Thereafter, if the UE initially accesses the BS, it may perform random access to the BS in steps S103 to S106. For random access, the UE may transmit a preamble to the BS on a Physical Random Access Channel (PRACH) in step S103 and receive a response message for random access on a PDCCH and a PDSCH corresponding to the PDCCH in step S104. In the case of contention-based random access, the UE may transmit an additional PRACH in step S105, and receive a PDCCH and a PDSCH corresponding to the PDCCH in step S106 in such a manner that the UE can perform a contention resolution procedure.

After the above random access procedure, the UE may receive a PDCCH/PDSCH (S107) and transmit a Physical Uplink Shared Channel (PUSCH)/Physical Uplink Control Channel (PUCCH) (S108) in a general uplink/downlink signal transmission procedure.

Control information that the UE transmits to the BS is referred to as uplink control information (UCI). The UCI includes a Hybrid Automatic Repeat and reQuest ACKnowledgment/Negative-ACK (HARQ ACK/NACK) signal, a Scheduling Request (SR), Channel Quality Indictor (CQI), a Precoding Matrix Index (PMT), and a Rank Indicator (RI).

In the LTE system, UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Figure 2:
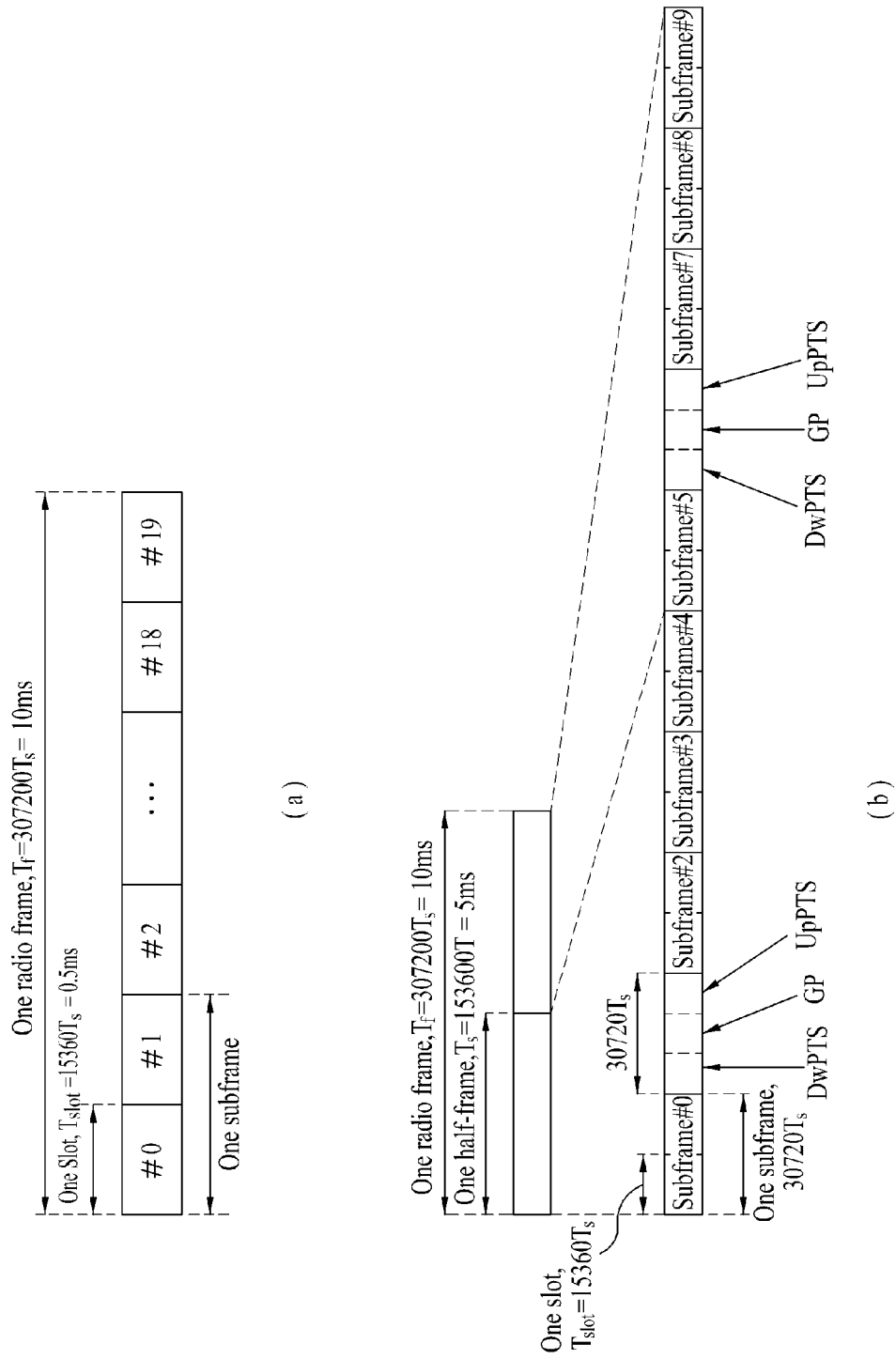
FIG. 2 is a diagram illustrating a structure of a radio frame for use in a 3GPP LTE system.

FIG. 2 is a diagram illustrating a structure of a radio frame for use in a 3GPP LTE system.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 2 (a) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2(b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink.

In frame structure type 2 of TDD system, the UL-DL configuration indicates how all the subframes are allocated (or reserved) to DL and UL. Table 1 shows UL-DL configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Referring to Table 1, D denotes a subframe for DL transmission, U denotes a subframe for UL transmission, and S denotes a special subframe composed of three fields (i.e., DwPTS, GP, UpPTS). The UL-DL configuration can be classified into 7 UL-DL configurations. The positions and numbers of DL subframes, special subframes, and UL subframes are different from each other per UL-DL configuration.

A time at which DL is changed to UL or a time at which UL is changed to DL is referred to as a switching point. Switch-point periodicity denotes a period in which switching between a UL subframe and a DL subframe is equally repeated. The switch-point periodicity supports each of 5 ms and 10 ms. In case of the 5 ms DL-UL switch-point period, a special subframe (S) is present per half-frame. In case of a 5 ms DL-UL switch-point period, the special subframe (S) is present only in a first half-frame.

In all configurations, each of the $0^{th}$ subframe, the $5^{th}$ subframe, and DwPTS are used for DL transmission only. UpPTS and a subframe immediately subsequent to the special subframe (S) are always used for UL transmission.

The above-mentioned UL-DL configuration is considered to be system information well known to all of the BS and the UE. The BS is configured to transmit only an index of configuration information whenever the UL-DL configuration information is changed, so that the change of a UL-DL allocation state of a radio frame can be recognized by the UE. In addition, configuration information is a kind of DL control information, and can be transmitted through a Physical Downlink Control Channel (PDCCH) serving as a DL control channel in the same manner as in other scheduling information. The configuration information serving as broadcast information can be commonly transmitted to all UEs contained in the cell through a broadcast channel.

The above-described structures of the radio frame are exemplary only. And, the number of subframes included in a radio frame, the number of slots included in the subframe and the number of symbols included in the slot may be modified in various ways.

Figure 3:
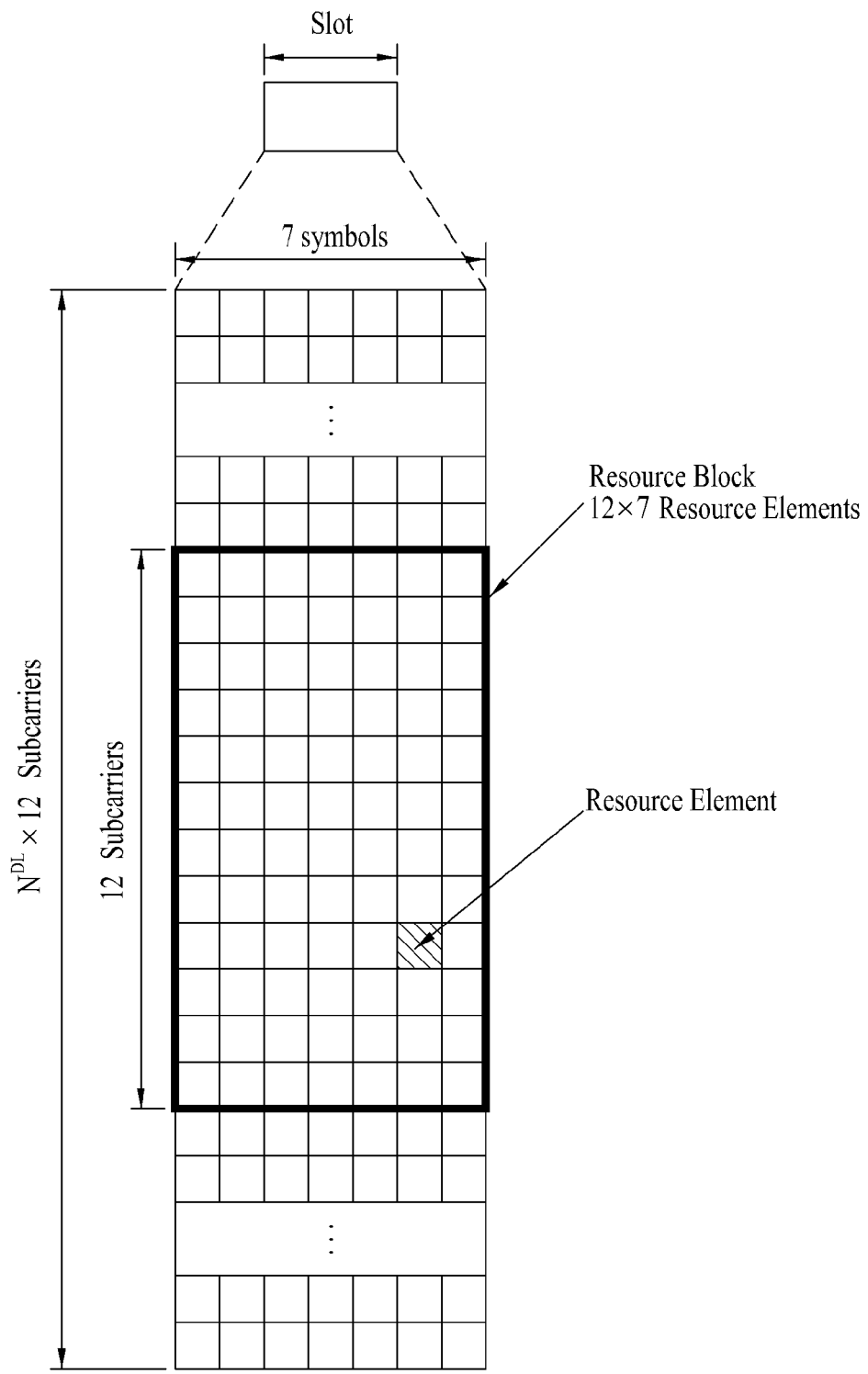
FIG. 3 exemplarily shows a resource grid of a single downlink slot.

FIG. 3 exemplarily shows a resource grid of a single downlink slot.

Referring to FIG. 3, one downlink slot includes a plurality of OFDM symbols in a time domain. Although one downlink slot includes 7 OFDM symbols and one resource block (RB) includes 12 subcarriers in a frequency domain, the scope or spirit of the present invention is not limited thereto.

Each element on a resource grid may be defined as a resource element (RE). One RB includes 12×7 REs. The number ($N^{DL}$) of RBs contained in a downlink slot is dependent upon a downlink transmission bandwidth. An uplink slot structure is identical to the downlink slot structure.

Figure 4:
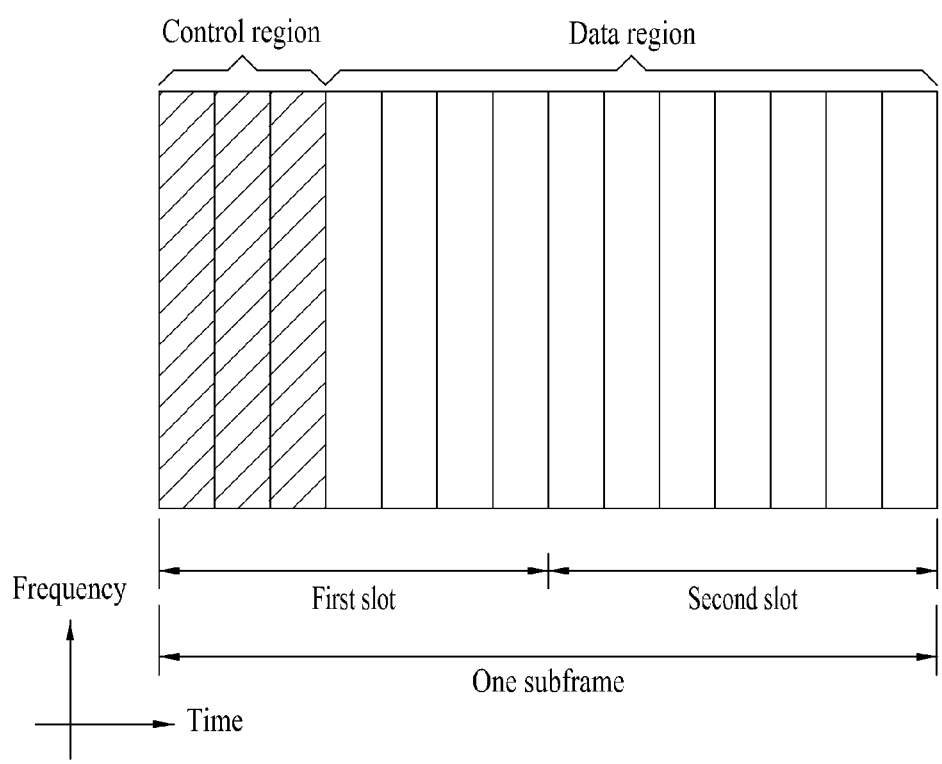
FIG. 4 illustrates a downlink subframe structure.

FIG. 4 illustrates a downlink subframe structure.

Referring to FIG. 4, a maximum of three OFDM symbols located in the front of a first slot of the subframe are used as a control region to which control channels are allocated, and the remaining OFDM symbols are used as a data region to which a Physical Downlink Shared Channel (PDSCH) is allocated. DL control channels for use in the 3GPP LTE system include a Physical Control Format Indicator Channel (PCFICH), a Physical Downlink Control Channel (PDCCH), a Physical Hybrid-ARQ Indicator Channel (PHICH), and the like.

PCFICH transmitted through a first OFDM symbol of the subframe may carry information about the number of OFDM symbols (i.e., size of the control region) used for transmission of control channels within the subframe. PHICH serving as a response channel to an uplink may carry ACK (Acknowledgement)/NACK (Non-Acknowledgement) signals about a Hybrid Automatic Repeat Request (HARQ). Control information transmitted over a PDCCH is referred to as Downlink Control Information (DCI). For example, DCI includes uplink resource allocation information (UL grant), downlink resource allocation information (DL grant), or an uplink transmission (UL Tx) power control command for an arbitrary UE group, etc.

PDCCH may carry information about resource allocation and transmission format (DL grant) of a downlink shared channel (DL-SCH), resource allocation information (UL grant) of an uplink shared channel (UL-SCH), paging information of a paging channel (PCH), resource allocation information about an upper layer control message such as a random access response transmitted over a PDSCH, a set of transmission power control commands for each UE contained in an arbitrary UE group, and information about Voice over Internet Protocol (VoIP) activation, etc. A plurality of PDCCHs may be transmitted within the control region, and the UE may monitor the PDCCHs. Each PDCCH includes an aggregate of one or more contiguous control channel elements (CCEs). A CCE is a logical allocation unit for providing a coding rate based on a radio frequency (RF) channel status to the PDCCH. A CCE may correspond to a plurality of resource element groups. PDCCH format and the number of available PDCCHs may be determined according to the relationship between the number of CCEs and the coding rate provided by CCEs.

A base station (BS) determines PDCCH format in accordance with DCI to transmit to a user equipment (UE) and attaches CRC (cyclic redundancy check) to control information. The CRC is masked with a unique identifier (called RNTI (radio network temporary identifier)) in accordance with an owner or usage of PDCCH. If the PDCCH is provided for a specific user equipment (UE), the CRC can be masked with a unique identifier of the user equipment (UE), i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI)). In order to indicate a random access response that is a response to a transmission of a random access preamble of a user equipment (UE). CRC can be masked with RA-RNTI (random access-RNTI).

Figure 5:
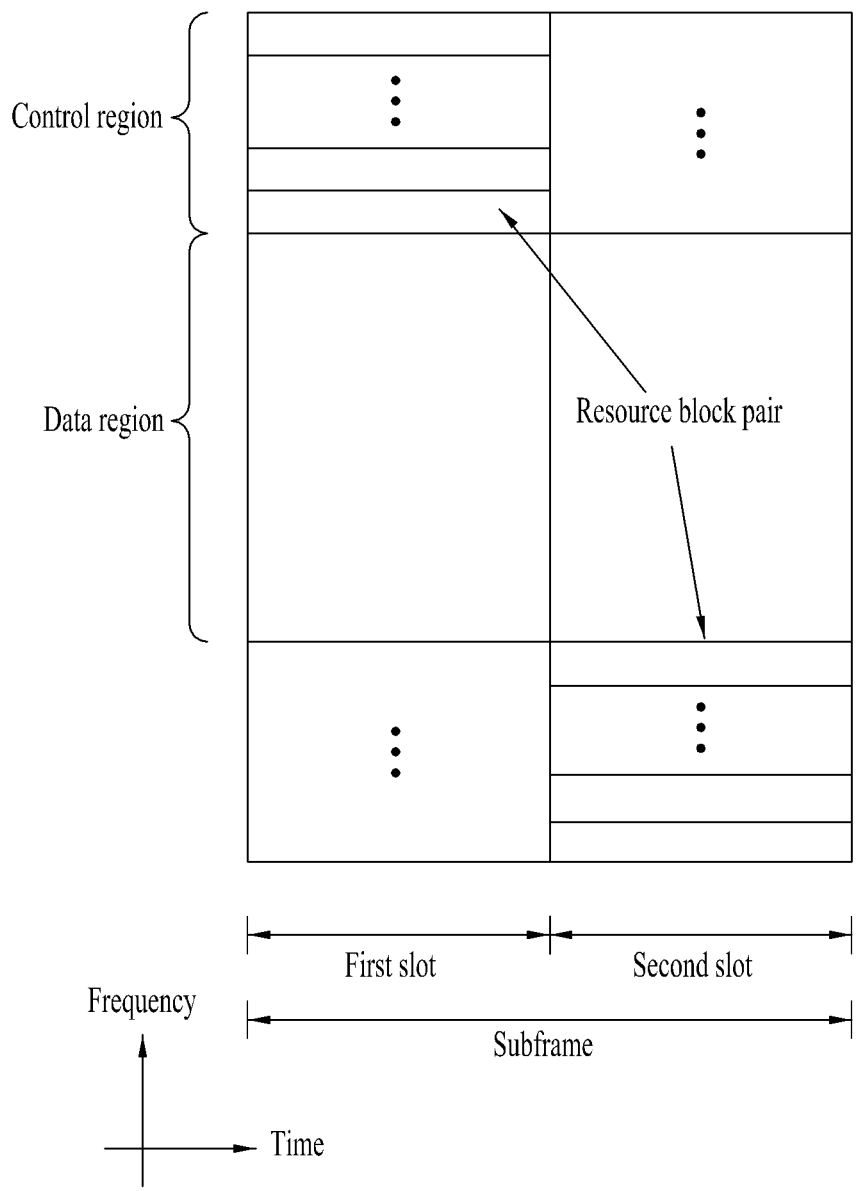
FIG. 5 illustrates an uplink subframe structure.

FIG. 5 illustrates an uplink subframe structure.

Referring to FIG. 5, a UL subframe is divided into a control region and a data region in the frequency domain. PUCCH carrying UL control information is allocated to the control region. PUSCH carrying user data is allocated to the data region. In order to maintain a single carrier property, one UE does not simultaneously transmit a PUCCH signal and a PUSCH signal. A PUCCH for one UE is allocated in an RB pair in a subframe and RBs belonging to the RB pair occupy different subcarriers in each of two slots. Thus, the RB pair allocated to the PUCCH is frequency-hopped on a slot boundary.

1.2. Downlink Measurement

In a wireless communication system, since packets (or signals) are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When a transmission end or a reception end of a wireless communication system transmits or receives data using multiple antennas so as to increase capacity or improve performance or throughput, additional reference signals are present in individual transmission (Tx) antennas, respectively. Signal reception can be correctly carried out under the condition that a channel state between each Tx antenna and each Rx antenna is recognized.

Reference Signals (RSs) for use in the wireless communication system may be broadly divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe, and the UE needs to perform channel management. The RS for channel measurement is also used for handover measurement or the like. The latter is an RS that a BS (eNB) transmits along with downlink data. A UE can demodulate the data by measuring a channel using the RS. This RS should be transmitted in a data transmission area.

In 3GPP LTE, a downlink reference signal defines a common reference signal (CRS) shared by all UEs in a cell and a dedicated reference signal (DRS) dedicated to a specific UE. CRS is used for two purposes, i.e., channel information acquisition and data demodulation. The CRS may also be referred to as cell-specific RS. A base station (BS) may transmit the CRS every subframe over a wideband. DRS may be transmitted through REs if data demodulation on a PDSCH is necessary. The UE may receive the presence or absence of the DRS from a higher layer and receive information indicating that the DRS is valid only when the PDSCH is mapped. The DRS may be also called a UE-specific RS or a Demodulation RS (DMRS).

The reception side (UE) estimates the channel state from the CRS and feeds back an indicator associated with channel quality, such as a Channel Quality Indicator (CQI), a Precoding Matrix Index (PMI) and/or a Rank Indicator (RI), to the transmission side (eNodeB). Alternatively, an RS associated with the feedback of Channel State Information (CSI) such as CQI/PMI/RI may be separately defined as a CSI-RS. The CSI-RS for channel measurement is characterized in that the CSI-RS is designed mainly for channel measurement unlike the CRS of the conventional LTE system which is used not only for channel measurement or the like but also for data modulation. Since the CSI-RS is transmitted only for the purpose of obtaining information regarding channel conditions, the BS transmits CSI-RS for all antenna ports. CSI-RS is transmitted to recognize downlink channel information, so that the CSI-RS is transmitted to the entire band unlike DRS.

In 3GPP LTE, a MIMO transmission scheme is categorized into open-loop MIMO operated without channel information of a receiver and closed-loop MIMO operated based on the channel information of the receiver. Especially, according to the closed-loop MIMO system, a transceiver may be able to perform beamforming based on channel information (i.e., CSI) to obtain a multiplexing gain of MIMO antennas. To obtain CSI from the UE, the BS allocates a PUCCH or a PUSCH to command the UE to feed back CSI for a downlink signal.

CSI is broadly divided into three types of information: a rank indicator (RI), a precoding matrix index (PMI), and a channel quality indicator (CQI).

RI is information on channel rank, indicating the number of streams (or layers) that the UE receives via the same time-frequency resources. Since RI is dominantly determined by long-term fading of a channel, RI is generally fed back from the UE to the BS at a cycle longer than that of PMI or CQI.

PMI is a value reflecting a spatial characteristic of a channel and indicates a precoding matrix index of the BS preferred by the UE based on a metric of signal-to-interference plus noise ratio (SINR). That is, PMI is information about a precoding matrix used for transmission at the transmitter. The precoding matrix fed back from the receiver may be determined considering the number of layers indicated by RI. PMI may be fed back in case of closed-loop spatial multiplexing (SM) and large delay cyclic delay diversity (CDD). In the case of open-loop transmission, the transmitter may select a precoding matrix according to predetermined rules. A process for selecting a PMI for each rank is as follows. The receiver may calculate a post processing SINR in each PMI, convert the calculated SINR into the sum capacity, and select the best PMI on the basis of the sum capacity. That is, PMI calculation of the receiver may be considered to be a process for searching for an optimum PMI on the basis of the sum capacity. The transmitter that has received PMI fed back from the receiver may use a precoding matrix recommended by the receiver. This fact may be contained as a 1-bit indicator in scheduling allocation information for data transmission to the receiver. Alternatively, the transmitter may not use the precoding matrix indicated by a PMI fed back from the transmitter. In this case, precoding matrix information used for data transmission from the transmitter to the receiver may be explicitly contained in the scheduling allocation information.

CQI indicates channel quality or channel intensity. Generally, CQI represents a reception SINR obtained when the BS uses a PMI. The UE reports a CQI index indicating a specific combination of an aggregate composed of combinations of a predetermined modulation scheme and code rate to the BS.

An advanced communication system such as an LTE-A system considers additional multi-user diversity through multi-user MIMO (MU-MIMO). MU-MIMO technology enables the BS to allocate individual antenna resources to different UEs, such that a UE capable of implementing a high-speed data transfer rate is selected and scheduled per antenna. For this multi-user diversity gain, higher accuracy is needed in terms of channel feedback. This is because, due to channel interference between UEs multiplexed in an antenna domain in MU-MIMO, accuracy of a feedback channel may significantly affect interference with other multiplexed UEs as well as a UE that reports feedback. Accordingly, the LTE-A standard has determined to separately design a final PMI as a long-term and/or wideband PMI, W1, and a short-term and/or subband PMI, W2, in order to raise accuracy of the feedback channel. A final PMI may be determined by a combination of W1 and W2.

A codebook can be transformed using a long-term covariance matrix of a channel, represented by Equation 1, as exemplary hierarchical codebook transformation that configures one final PMI with two pieces of channel information (W1 and W2).

$$W = \text{norm}(W1\,W2) \quad \text{[Equation 1]}$$

In Equation 1, W2 is a short-term PMI, which is a codeword of a codebook reflecting short-term channel information, W1 is a long-term covariance matrix, and norm(A) is a matrix obtained by normalizing each column of matrix A to 1. W is a transformed codeword of a final codebook. Conventionally, codewords W1 and W2 are given as Equation 2.

$$W1(i) = \begin{bmatrix} X_i & 0 \\ 0 & X_i \end{bmatrix}, \quad \text{[Equation 2]}$$

where $X_i$ is Nt/2 by M matrix.

$$W2(j) = \overbrace{\begin{bmatrix} e_M^k & e_M^l & e_M^m \\ \alpha_j e_M^k & \beta_j e_M^l & \cdots & \gamma_j e_M^m \end{bmatrix}}^{r\,\text{columns}}$$

(if rank=r), where $1 \leq k,l,m \leq M$ and k,l,m are integer.

In Equation 2, the codewords are designed so as to reflect correlation characteristics between channels, if cross-polarized antennas are densely arranged (usually, the distance between adjacent antennas is equal to or less than half a signal wavelength). The cross-polarized antennas may be divided into a horizontal antenna group and a vertical antenna group and the two antenna groups are co-located, each having the property of a uniform linear array (ULA) antenna. Therefore, correlation between antennas in each group has the same linear phase increment property and correlation between the antenna groups is characterized by phase rotation. Since a codebook is obtained by quantizing values of channels, it is necessary to design a codebook reflecting channel characteristics corresponding to sources. For convenience of description, a rank-1 codeword designed in the above manner may be given by way of example and it can be confirmed that the channel characteristics are reflected in the codewords satisfying Equation 2.

$$W1(i) * W2(j) = \begin{bmatrix} X_i(k) \\ \alpha_j X_i(k) \end{bmatrix} \quad \text{[Equation 3]}$$

In Equation 3, a codeword is expressed as an $N_T \times 1$ vector (where $N_T$ is the number of Tx antennas) and the codeword is composed of an upper vector $X_i(k)$ and a lower vector $\alpha_j X_i(k)$, representing the correlation characteristics of the horizontal and vertical antenna groups, respectively. $X_i(k)$ is favorably expressed as a vector having the linear phase increment property, reflecting the correlation characteristics between antennas in each antenna group. For example, a discrete Fourier transform (DFT) matrix may be used for $X_i(k)$.

For CoMP, higher channel accuracy is needed. In CoMP joint transmission (JT), since a plurality of eNBs cooperatively transmits the same data to a specific UE, CoMP JP may be theoretically regarded as a MIMO system in which antennas are geographically distributed. Namely, even when MU-MIMO is performed in JT, channel accuracy of a high level is needed to avoid interference between co-scheduled UEs as in single-cell MU-MIMO. In CoMP coordinated beamforming (CB), accurate CSI is needed to avoid interference of neighboring cells with a serving cell.

Meanwhile, recently, the 3GPP LTE-A has actively conducted research on enhanced inter-cell interference coordination (eICIC) as an interference coordination method between eNBs (or BSs). According to the interference coordination scheme, when a cell causing interference is defined as an aggressor cell or a primary cell and an interfered cell is defined as a victim cell or a secondary cell, the aggressor cell or the primary cell stops data transmission in a specific resource region such that a UE maintains access to the victim cell or the secondary cell in the corresponding resource region. Time-domain inter-cell interference coordination may be implemented as one interference coordination method. In time-domain inter-cell interference coordination, an aggressor cell uses a silent subframe (also called an almost blank subframe (ABS)), in which transmission power/activity of some physical channels is reduced (or zero power for the physical channels is configured), and a victim cell schedules a UE in consideration of power reduction of the aggressor cell. From the perspective of a victim cell UE, interference level significantly varies according to presence or absence of a silent subframe. A UE located at a boundary between the aggressor cell and a victim cell may have interference due to the occurrence of interference between Tx signals of individual cells.

To more accurately perform a radio link monitoring (RLM) operation or a radio resource management (RRM) including reference signal received power (RSRP)/reference signal received quality (RSRQ) measurement, or measure CSI for link adaptation in each subframe, monitoring/measurement should be restricted to a set of subframes having uniform interference characteristics.

In 3GPP LTE, restricted RLM and RRM/CSI measurement is defined as follows.

1) Radio Link Monitoring (RLM)

A downlink radio link quality may be monitored by a physical layer of a UE for the purpose of indicating "out-of-sync" or "in-sync" status to a higher layer.

In a non-discontinuous reception (non-DRX) mode operation, a physical layer of the UE compares a threshold value ($Q_{out}$ and $Q_{in}$) with a value measured over a previous time period in every radio frame, and monitors radio link quality. In contrast, during the DRX mode operation, the physical layer in the UE may monitor radio link quality by comparing a threshold value ($Q_{out}$ and $Q_{in}$) with a value measured over a previous time period at least once every DRX (Discontinuous Reception) period. In this case, if higher layer signaling indicates specific subframes to monitor a radio link, the radio link quality is not monitored in the remaining subframes other than indicated subframes.

If the radio link quality is worse than the threshold value ($Q_{out}$) within radio frames in which the radio link quality has been evaluated, the physical layer of the UE indicates "out-of-sync" to a higher layer. That is, "out-of-sync" is an event generated when a channel quality is equal to or less than a predetermined level on the condition that the UE measures a signal from the serving BS. In this case, the channel quality may be measured from a Signal-to-Noise Ratio (SNR) measured using a cell-specific reference signal (CRS) from among downlink signals received from the BS. Alternatively, "out-of-sync" may be provided to a higher layer when it is impossible to demodulate a PDCCH received from a lower layer (physical layer) or SINR is low in level.

In contrast, the physical layer of the UE may indicate "in-sync" to the higher layer when a radio link quality is better than a threshold value ($Q_{in}$) within radio frames in which radio link quality is evaluated. That is, "in-sync" is an event generated when a channel quality is higher than a predetermined level on the condition that the UE measures a signal from the serving BS.

2) Channel Quality Indicator (CQI)

CQI is information regarding channel quality. CQI may be represented by a predetermined MCS combination. CQI index may be given as shown in the following table 2.

Table 2 shows a table of CQI indexes.

TABLE 2

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5 5547 |

Table 3 shows a PDSCH transmission scheme for CSI reference resources.

TABLE 3

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; other Transmit diversity |
| 8 | If the UE is configured without PMI/RI reporting: if the number of PBCH antenna ports is one, single-antenna port, port 0; otherwise transmit diversity. If the UE is configured with PMI/RI reporting: closed-loop spatial multiplexing |
| 9 | If the UE is configured without PMI/RI reporting: if the number of PBCH antenna ports is one, single-antenna port, port 0: otherwise transmit diversity. Closed-loop spatial multiplexing with up to 8 layer transmission, ports 7-14 (see subclause 7.1.5B) |

Referring to Table 2, CQI index may be represented by 4 bits (i.e., CQI indexes of 0~15). Each CQI index may indicate a modulation scheme and a code rate.

A CQI calculation method will hereinafter be described. The following assumptions (1) to (9) for allowing a UE to calculate a CQI index are defined in 3GPP LTE/LTE-A.

(1) The first three OFDM symbols in one subframe are occupied by control signaling.

(2) Resource elements (REs) used by a primary synchronization signal, a secondary synchronization signal or a physical broadcast channel (PBCH) are not present.

(3) CP length of a non-MBSFN subframe is assumed.

(4) Redundancy version is set to zero (0).

(5) In case of CSI reporting in Tx mode 9, if PMI/RI reporting is configured by the UE, DMRS overhead is identical to the last reported rank.

(6) Resource elements (REs) allocated for CSI-RS and zero-power CSI-RS are not present.

(7) REs allocated for Positioning Reference Signal (PRS) are not present.

(8) PDSCH transmission method may be dependent upon a current transmission mode (e.g., a default mode) configured in a UE, as represented by Table 3.

(9) If CRS is used for channel measurement, the ratio of PDSCH EPRE (Energy Per Resource Element) to a cell-specific reference signal EPRE may be given with the exception of $\rho_A$. (A detailed description of $\rho_A$ may follow the following assumption. Provided that a UE for an arbitrary modulation scheme may be set to a Transmission Mode 2 having four cell-specific antenna ports or may be set to a Transmission Mode 3 having an RI of 1 and four cell-specific antenna ports, $\rho_A$ may be denoted by $\rho_A = P_A + \Delta_{offset} + 10 \log_{10}(2)$ [dB]. In the remaining cases, in association with an arbitrary modulation method and the number of arbitrary layers, $\rho_A$ may be denoted by $\rho_A = P_A + \Delta_{offset}$ [dB]. $\Delta_{offset}$ is given by a nomPDSCH-RS-EPRE-Offset parameter configured by higher layer signaling.)

Definition of the above-mentioned assumptions may indicate that CQI includes not only information regarding channel quality but also various information of a corresponding UE. That is, different CQI indexes may be fed back according to throughput or performance of the corresponding UE at the same channel quality, so that it is necessary to define a predetermined reference for the above-mentioned assumption.

Although RLM/RRM measurement for the legacy serving cell has been carried out using CRS, precoding is applied to a transmission (Tx) mode (e.g., Tx mode 9) in which DMRS is used, so that this RLM/RRM measurement may be different from measurement of a link in which actual transmission is achieved. If a PMI/RI reporting mode is configured in Tx mode 9, the UE may perform channel measurement so as to calculate a CQI value on the basis of the CSI reference signal only. On the other hand, if PMI/RI reporting is not achieved in Tx mode 9, the UE may perform channel measurement so as to calculate a CQI on the basis of CRS.

The process for allowing the UE to recognize a channel state and determine an appropriate MCS may be defined in various ways in terms of UE implementation. For example, the UE may calculate a channel state or an effective SINR using a reference signal (RS). In addition, the channel state or the effective SINR may be measured on the entire system bandwidth (also called 'Set S') or may also be measured on some bandwidths (specific subband or specific RB). The CQI for the set S may be referred to as a Wideband (WB) CQI, and the CQI for some bandwidths may be referred to as a subband (SB) CQI. The UE may determine the best MCS on the basis of the calculated channel state or effective SINR. The best MCS may indicate an MCS that satisfies the CQI calculation assumption without exceeding a transport block error rate of 10% during decoding. The UE may determine a CQI index related to the MCS and may report the determined CQI index to the BS (eNB).

The LTE/LTE-A system defines a CSI reference resource for the above-described CSI feedback/reporting. The CSI reference resource is defined by a group of downlink physical RBs (PRBs) corresponding to a frequency band for which a CQI is calculated in the frequency domain. From a time perspective, for CSI transmission/reporting in subframe n, the CSI reference resource is defined by a single downlink subframe, $n-n_{CQI\_ref}$.

For periodic CSI reporting, $n-n_{CQI\_ref}$ is the smallest value greater than or equal to 4, which is a valid downlink subframe. That is, in case of an uplink subframe for CSI reporting, $n-n_{CQI\_ref}$ may indicate a valid downlink subframe located closest to an uplink subframe for CSI reporting from among subframes located before a predetermined offset (e.g., 4 subframes). For aperiodic CSI reporting, a CSI reference resource is identical to a valid downlink subframe to which the corresponding CSI request contained in an uplink DCI format (e.g., DCI format 0) is transmitted. In addition, for aperiodic CSI reporting triggered by a Random Access Response Grant carrying a CSI request, $n-n_{CQI\_ref}$ equals 4.

In addition, if a higher layer may configure CSI subframe sets ($C_{CSI,0}$, $C_{CSI,1}$) for the UE, each CSI reference resource is included in one of the two CSI subframe sets ($C_{CSI,0}$, $C_{CSI,1}$), not in both.

For implementation of a valid downlink subframe, the following conditions i) to vi) are needed: i) a downlink subframe for the corresponding UE is achieved; ii) a Multicast-Broadcast Single Frequency Network (MBSFN) subframe is not achieved in the remaining cases other than Tx mode 9; iii) a DwPTS field is not included in a downlink subframe when the length of DwPTS occupies a predetermined size or less in a special subframe of a TDD system; iv) a downlink subframe is not contained in a measurement gap configured for the corresponding UE; and vi) if the UE is configured to have a CSI subframe set in case of periodic CSI reporting, a downlink subframe should correspond to elements of a CSI subframe set related to periodic CSI reporting. On the other hand, if a valid downlink subframe for CSI reference resources is not present, CSI reporting is omitted at an uplink subframe #n.

3) Radio Resource Management (RRM)

Measurement for PRRM may be largely classified into Reference Signal Received Power (RSRP), Reference Signal Received Quality (RSRQ), etc. RSRQ may be measured through a combination of RSRP and U-UTRA carrier RSSI (Received Signal Strength Indicator).

RSRP is defined as a linear average over power distribution of REs that carry cell-specific reference signals (CRSs). For RSRP decision, CRS ($R_0$) corresponding to Antenna Port 0 may be used. In addition, for RSRP decision, CRS ($R_1$) corresponding to Antenna Port 1 may be used. If Receive (Rx) diversity is used by a UE, a reported value may be less than the corresponding RSRP of each diversity branch. For RSRP decision, the number of REs used in a measurement frequency band or measurement period used by the UE may be determined by the UE within the limit of satisfying the corresponding measurement accuracy requirements. In addition, power per RE may be decided from energy received in symbol parts other than Cyclic Prefix (CP).

Reference Signal Received Quality (RSRQ) may be defined as N×RSRP/E-UTRA Carrier RSSI. In this case, N may denote the number of RBs of the E-UTRA carrier RSSI measurement band. In the above-mentioned equation, measurement of a numerator and denominator may be calculated from the same RB set.

E-UTRA Carrier RSSI may include the linear average of total Rx power sensed from all sources that include a co-channel serving cell and non-serving cell, contiguous channel interference, thermal noise, etc. within OFDM symbols including a reference symbol corresponding to Antenna Port #0, throughout N resource blocks (REs) within a measurement band. In contrast, if specific subframes for performing RSRQ measurement are indicated by higher layer signaling, RSSI is measured through all OFDM symbols contained in the indicated subframes. If Rx diversity is used by the UE, the reported value may not be lower than the corresponding RSRP of each diversity branch.

2. Method for Configuring Downlink Tx Power

The present invention proposes a method for allowing a BS (or eNB) to properly adjust Tx power so as to mitigate the inter-cell interference on the condition that the amount of UL resources and the amount of DL resources are dynamically changed according to the amount of UL traffic and the amount of DL traffic.

FIG. 6 is a conceptual diagram illustrating inter-cell interference generated according to a transmission (Tx) direction of a contiguous cell when two contiguous cells are configured to use the same time and/or frequency resources.

FIG. 6(a) exemplarily shows that eNB2 of a contiguous cell in resources through which eNB1 performs downlink transmission for UE1 located in a coverage performs downlink transmission for UE2, and FIG. 6(b) exemplarily shows that eNB2 of a contiguous cell in resources through which eNB1 performs downlink transmission for UE1 located in a coverage receives uplink transmission information from UE2. In FIG. 6(a), downlink transmission of eNB1 may cause interference to DL signal reception of UE2. In FIG. 6(b), downlink transmission of eNB1 may cause interference to UL signal reception of eNB2.

As described above, the degree and attributes of inter-cell interference may be changed according to whether a contiguous eNB uses the same time/frequency resources for UL or DL. Generally, the eNB and the UE are different from each other in terms of Tx power, antenna gain, antenna installation height, shadowing attributes, etc. Although DL Tx power of eNB1 is fixed in the example of FIG. 6, influence of interference applied to a coverage cell of eNB2 may be changed according to a method for operating eNB2 in the corresponding time/frequency resources. For example, eNB (or BS) generally has higher Tx power and higher antenna gain than a UE and is more likely to be positioned at a high altitude. Assuming that eNB and UE use the same Tx power, interference applied to reception of a neighbor eNB is relatively higher than interference applied to a contiguous-cell UE.

In order to minimize interference generated between contiguous cells, the present invention proposes a method for allowing the eNB to flexibly adjust power level needed for downlink transmission on the condition that each cell dynamically changes the amount of UL/DL resources according to its own traffic amount. For example, the eNB (or BS) may divide time and/or frequency resources used for DL transmission into a plurality of aggregates according to utility of resources of neighbor eNB, and may apply different Tx power levels to individual aggregates. Referring back to FIG. 6, in case of using resources through which the operation of FIG. 6(a) is performed, UE2 receives an eNB2 signal having relatively high power, and a channel between eNB1 and UE2 has a relatively high attenuation value, such that DL Tx power can be adjusted in such a manner that eNB1 can use relatively high power. In contrast, in case of using resources through which the operation of FIG. 6(b) is performed, eNB2 may receive a UE2 signal having a relatively lower power, a channel between eNB1 and eNB2 has a high line-of-sight (LOS) possibility and a relatively low attenuation value, such that the eNB1 can adjust Tx power in such a manner that a relatively low power is used.

The following description assumes that eNB can dynamically change the amount of UL/DL resources according to the amount of traffic. For implementation of such dynamic change, if there is a large amount of UL traffic in resources configured as DL resources, the eNB may temporarily schedule UL transmission of the UE: or if there is a large amount of DL traffic in resources configured as DL resources, the eNB may temporarily perform DL transmission for the UE using other resources configured as UL resources. In this case, the UL resources may denote an uplink band (UL band) in case of an FDD system, and may denote a UL subframe in case of a TDD system. In addition, DL resources may denote a DL band in the FDD system, and may denote a DL subframe in the TDD system. For example, if there is a large amount of DL traffic under the condition that the eNB (or BS) informs a plurality of unspecified UEs that a specific subframe is configured as an uplink subframe, specific information indicating that the corresponding subframe is switched for the purpose of DL transmission may be temporarily signaled to a specific UE. In addition, the network may specify and configure resources through which a method for utilizing UL/DL resources is dynamically changed, and it is obvious to those skilled in the art that the principles of the present invention can also be applied thereto without departing from the scope or spirit of the present invention.

For clarity, a DL resource (or subframe) configured according to resource regulation of a specific eNB does not include an uplink (UL) resource (or subframe) temporarily changed for the purpose of DL transmission. On the contrary, it is assumed that a UL resource (or subframe) configured according to resource regulation of a specific eNB does not include a DL resource (or subframe) temporarily changed for the purpose of UL transmission. For clarity, it is assumed that a boundary of UL/DL subframes is aligned for convenience of description.

Figure 7:
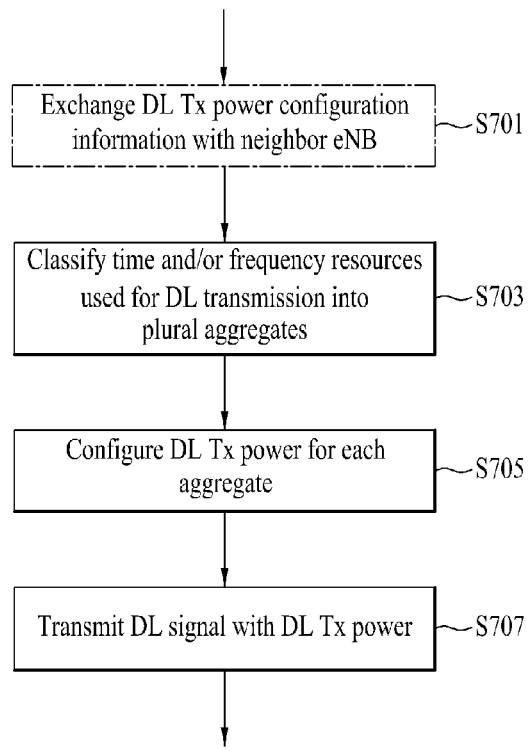
FIG. 7 is a flowchart illustrating a method for configuring downlink (DL) transmit (Tx) power according to an embodiment of the present invention.

FIG. 7 is a flowchart illustrating a method for configuring downlink (DL) transmit (Tx) power according to an embodiment of the present invention.

Referring to FIG. 7, each eNB may exchange DL Tx power configuration information with a neighbor eNB in step S701. The eNB having received DL Tx power configuration information from the neighbor eNB may perform a series of operations (S703~S705) for configuring (adjusting) DL Tx power on the basis of the corresponding information.

On the other hand, for convenience of description, FIG. 7 exemplarily shows that the step for allowing the eNB to exchange DL Tx power configuration information with a neighbor eNB is exchanged before execution of steps (S703~S705) in which the corresponding eNB configures (adjusts) the DL Tx power, and the scope or spirit of the present invention is not limited thereto. For example, after each eNB performs steps (S703~S705) for configuring (adjusting) DL Tx power, DL Tx power configuration information may be transferred to a neighbor eNB according to the DL Tx power configuration result, and the neighbor eNB may adjust its own DL Tx power or perform resource scheduling on the basis of the received DL Tx power configuration information. In this case, step S701 in which the eNB exchanges DL Tx configuration information with the neighbor eNB may also be performed after step S705 or step S707.

In addition, the eNB does not exchange DL Tx power configuration information with the neighbor eNB, and may perform a series of operations (S703 S705) for independently configuring(adjusting) DL Tx power. In this case, step S701 in which the eNB exchanges DL Tx power configuration information with the neighbor eNB may be omitted.

The eNB (or BS) may classify time and/or frequency resources needed for DL transmission into a plurality of aggregates in step S703. Time and/or frequency resources used for DL transmission may belong to both DL resource (or subframe) and UL resource (or subframe) temporarily changed for the purpose of DL transmission, such that they can be discriminated using a plurality of aggregates. The time and/or frequency resources may belong to any one of DL resource (or subframe) and UL resource (or subframe) temporarily changed for the purpose of DL transmission, such that they can be discriminated using a plurality of aggregates.

For example, the eNB may classify time and/or frequency resources used for DL transmission into a plurality of aggregates according to resource utility of the neighbor eNB.

In Table 4, time and/or frequency resources used for DL transmission by a specific eNB are classified according to resource utility of the neighbor eNB, and a detailed description thereof is as follows.

TABLE 4

| | | eNB (DL transmission) | |
| --- | --- | --- | --- |
| | | DL resource (subframe) | UL resource (subframe) |
| Neighbor eNB | DL transmission | ① | ② |
| | UL reception | ③ | ④ |

Referring to Table 4, under the environment in which each eNB dynamically changes the amount of UL/DL resources according to the amount of traffic, the neighbor eNB may use the same resource for DL transmission (①) or for UL reception (③). If a specific eNB performs DL transmission using UL resources changed for the purpose of DL transmission, the neighbor eNB may use the same resource for DL transmission (②) or UL reception (④). That is, if a specific eNB performs DL transmission using DL resources or UL resources changed for the purpose of DL transmission, the neighbor eNB may use the same resource for DL transmission or UL reception.

If time and/or frequency resources used for DL transmission belong to both DL resource (or subframe) and UL resource (or subframe) temporarily changed for the purpose of DL transmission, and the eNB can discriminate the time and/or frequency resources using a plurality of aggregates, the cases (①, ②, ③, ④) of Table 4 are subject to the time and/or frequency resources, the time and/or frequency resources may be classified into one group composed of the cases (①, ②) and the other group composed of the cases (③, ④) according to resource utility of the neighbor eNB.

In addition, if time and/or frequency resources are subject only to DL resource (or subframe) and classified into a plurality of aggregates, the resources may be subject to the cases (①, ③) of Table 4, or the resources may be classified into one case (①) and the other case (③) according to resource utility of the neighbor eNB. In addition, if time and/or frequency resources are subject only to UL resource (or subframe) and classified into a plurality of aggregates, the resources may be subject to the cases (②, ④), or the resources may be classified into one case (②) and the other case (④).

As described above, the eNB may classify time and/or frequency resources used for DL transmission into a plurality of aggregates according to resource usages of the neighbor eNB. For convenience of description, although the above example has disclosed that the usage of resources used by the neighbor eNB is classified into UL transmission and DL transmission, the purpose of resource usage of the neighbor eNB is classified into silent/blank subframes and the remaining subframes, and the eNB may classify time and/or frequency resources used for DL transmission into a plurality of aggregates according to individual usages.

In another example, the eNB may classify time and/or frequency resources used for DL transmission according to resource regulations configured by the eNB. For example, the eNB may classify the time and/or frequency resources according to DL resource (or subframe) and UL resource (or subframe) temporarily changed for DL transmission. In this case, the cases (①, ②, ③, ④) may be subject to the above time and/or frequency resources. The time and/or frequency resources may be classified into the cases (①, ③) and other cases (②, ④) according to the resource regulation indicating that a resource for DL transmission is a downlink or uplink resource. In addition, for convenience of description, the above example has disclosed that resources configured by the eNB are classified into a DL resource and an uplink resource, but the eNB may also classify the resources into a silent/blank subframe and other subframes within DL resources configured by the eNB.

Besides, the eNB may newly define a resource for DL usage and a resource for UL usage, and may also classify time and/or frequency resources for DL transmission according to a DL resource and a UL resource. The DL resource and the UL resource will hereinafter be described in section 2.2.

Although the above-mentioned examples have disclosed that time and/or frequency resources for DL transmission are classified into two aggregates for convenience of description and better understanding of the present invention, the scope or spirit of the present invention is not limited thereto, and time and/or frequency resources for DL transmission may also be classified into many more aggregates by combination of the above-mentioned examples without departing from the scope or spirit of the present invention.

In step S705, the eNB may configure different Tx power values according to the classified aggregates of step S703. In this case, DL signal transmission power may be independently configured for each time and/or frequency resource to be used for DL transmission belonging to each aggregate, and a specific aggregate may (relatively) configure DL signal transmission power depending upon another aggregate.

Subsequently, the eNB may transmit a DL signal to the UE with the configured DL Tx power in step S707.

A method for configuring DL Tx power according to the present invention will hereinafter be described in detail.

2.1. First Embodiment

For the above-mentioned operations, neighbor eNBs may exchange necessary information with each other through a backhaul link (e.g., X2 interface). In this case, information exchanged between neighbor eNBs may include an indicator for indicating whether each eNB will use each time and/or frequency resource for UL or DL, information regarding a Tx power level (or a relative difference between Tx power levels of individual resources) to be used by the eNB in time and/or frequency resources, and information regarding a maximum Tx power level available in each time and/or frequency resource. In this case, each time and/or frequency resource may be configured in units of a subframe, a half frame, a radio frame, a PRB, a subband, etc. In addition, Tx power level to be used by eNB, a relative difference between Tx power levels, or a maximum available Tx power level in association with each resource may be set to a specific value selected from an aggregate of predetermined Tx power values. In addition, as an example of the relative difference in Tx power level among individual resources, the eNB may transmit between a Tx power level of each resource and any one of a threshold value and an average value of Tx power levels of all resources contained in the corresponding information to the neighbor eNB.

Referring to FIG. 7, time and/or frequency resources for DL transmission are classified into a plurality of aggregates, and different signal Tx power levels may be assigned to individual identified aggregates.

In this case, if DL Tx power of DL resource is configured to be different from DL Tx power of UL resource for UL usage by the eNB, a power level value of a DL Tx signal transferred from a specific eNB to a neighbor eNB may be valid even at a place dedicated for UL resources. In other words, in order to inform a neighbor eNB of DL Tx power level information of UL resources in which a message or indicator needed when a specific eNB transmits DL Tx power level information to a neighbor eNB, the Tx power level value of the DL Tx signal can also be used. As described above, the power level information of a DL Tx signal of each resource transferred from the eNB to the neighbor eNB may have the same message format or the same indicator format in association with individual discriminated aggregates, and may also be configured to indicate different kinds of information in the individual aggregates as necessary.

For example, 3GPP LTE has defined a Relative Narrow band Transmission Power (RNTP) for coordination of inter-cell DL interference, and has exchanged this RNTP parameter among eNBs. Here, RNTP is an indicator for informing each neighbor eNB of specific information as to whether Tx power of each eNB in each PRB is limited to a predetermined threshold or less. Each bit for indicating the PRB in RNTP may correspond to one PRB in the frequency domain, such that one RNB for transmitting RNTP may directly inform a neighbor eNB of specific information as to whether Tx power of each PRB is not higher than a predetermined threshold value corresponding to the upper limit Tx power. In this case, the RNTP threshold may be determined within an aggregate composed of {−∞, −11, −10, −9, −8, −7, −6, −5, −4, −3, −2, −1, 0, +1, +2, +3}. If Tx power of the corresponding eNB does not exceed the RNTP threshold, a zero value '0' is transmitted. If Tx power of the corresponding eNB exceeds the RNTP threshold, a value of '1' may be transmitted.

The eNB having received RNTP from a neighbor eNB may consider an RNTP that has been received when the scheduling policy is configured, and the received RNTP may be considered valid until a new RNTP is received and updated at a later time. In other words, the eNB may schedule a UE located in its own coverage in consideration of interference estimated in each PRB on the basis of the received RNTP. For example, if a Tx power at a specific PRB of the neighbor eNB is higher than a threshold value, the eNB having received the RNTP may not allocate information to a cell-edge UE at the corresponding PRB, or inter-cell interference may be reduced using low Tx power at the corresponding PRB.

If eNB for RNTP transmission desires to perform DL transmission at UL resource (for example, UL subframe of the TDD system or UL band of the FDD system) due to instantaneous increase of DL traffic, a second RTNP threshold different from a threshold value (first RTNP threshold) applied to DL transmission in DL resources may be applied to a neighbor eNB, and a second RNTP indicator for indicating whether DL Tx power of the eNB is limited to the second RTNP threshold or less within each UL resource may be transferred to a neighbor eNB. As described above, power level information of a DL Tx signal may be composed of an RNTP indicator and RNTP threshold value associated with each aggregate.

In this case, the second RTNP threshold value may be relatively calculated from the first RTNP threshold value applied to DL transmission of the legacy DL resource. For example, if the first RTNP threshold value is decided within a specific aggregate as described above, the second RTNP threshold may be determined to be a level that is higher or lower than the first RTNP threshold value by several stages within the same aggregate. In this case, only the first RTNP threshold value may be exchanged between neighbor eNBs, or offset information of the second RTNP threshold value may also be exchanged between the neighbor eNBs. In this case, if the second RTNP threshold is (relatively) calculated on the basis of the first RTNP threshold value, a valid period of the first RTNP threshold may also be applied to the second RTNP threshold.

As described above, the eNB classifies time and/or frequency resources used for DL transmission according to DL resource (or subframe) and a UL resource (or subframe) temporarily changed for the purpose of DL transmission on the basis of the resource regulation configured by the eNB, and may transmit different RNTP threshold values and different RNTP indicators to the neighbor eNBs.

In addition, the eNB may classify subframes into a silent/blank subframe and other subframes within DL resources configured by the eNB, and may transmit different RNTP threshold values and different RNTP indicators to the neighbor eNBs.

In addition, time and/or frequency resources for DL transmission may be classified according to resource utility of the neighbor eNB, and different RNTP threshold values and different RNTP indicators may also be transmitted to the neighbor eNB. For example, the time and/or frequency resources to be used for DL transmission by the eNB may be classified according to whether the eNB uses the same time and/or frequency resources as UL or DL resource, or may also be classified into a silent/blank subframe configured by the neighbor eNB and the remaining subframes other than the silent/blank subframe, such that different RNTP threshold values and different RNTP indicators may also be transferred to the neighbor eNB.

2.2. Second Embodiment

The operations of the present invention may also be designed in a manner that a communication system of the embodiment can operate without exchanging signals between a plurality of eNBs. That is, although two eNBs are contiguous to each other according to the eNB installation method, a stable backhaul link may not be present between the two eNBs. In this case, it is difficult to perform Tx power coordination based on the exchange of information through a backhaul link between two contiguous eNBs as shown in the above-mentioned section 2.1, such that a method for allowing one eNB to properly coordinate Tx power in response to a status of the other eNB without additional signal exchange is needed. For example, a femto BS that is directly purchased and installed by a user may correspond to the above-mentioned case.

For convenience of description and better understanding of the present invention, detailed operations of the present invention will hereinafter be described using a femto BS as an example. In this case, the femto BS may also be referred to as a micro BS (micro cell), a home eNB/HeNB, etc. Hereinafter, the femto BS, the micro cell, the home eNB/HeNB. etc. will be referred to as a home eNB (HeNB). HeNB may coordinate its own DL Tx power on the basis of a DL signal measurement value received from the neighbor eNB in DL time and/or frequency resources. In more detail, HeNB may coordinate its own TX power so as to minimize co-channel DL interference applied to a UE of the neighbor eNB.

Table 5 exemplarily shows a method for allowing a home eNB (HeNB) to decide a maximum value of DL Tx power on the basis of a DL signal measurement value of a contiguous cell in the 3GPP LTE system.

TABLE 5

| Input Conditions | Output power, Pout |
|---|---|
| $I_{oh}$ (DL) > CRS $\hat{E}_s$ + 10 $\log_{10}(N_{RB}^{DL} N_{SC}^{RB})$ + 30 dB and | ≤10 dBm |
| Option 1: CRS $\hat{E}_s$ ≥ −127 dBm or | |
| Option 2: CRS $\hat{E}_s$ ≥ −127 dBm and $I_{ob}$ > −103 dBm | |

TABLE 5-continued

| Input Conditions | Output power, Pout |
|---|---|
| IOH (DL) ≤ CRS $\hat{E}s$ + 10 $\log_{10}(N_{RB}^{DL} N_{SC}^{RB})$ + 30 dB and<br>Option 1: CRS $\hat{E}s$ ≥ −127 dBm or<br>Option 2. CRS $\hat{E}s$ ≥ −127 dBm and Iob > −103 dBm | ≤max (Pmin, min (Pmax, CRS $\hat{E}s$ + 10 $\log_{10}(N_{RB}^{DL} N_{SC}^{RB})$ + X ))<br>30 dB ≤ X ≤ 70 dB<br>Pmin = −10 dBm |

Referring to Table 5, output power (Pout) of the home eNB (HeNB) may be differently decided according to input conditions.

The following parameters may be used for input conditions shown in Table 5.

CRS $\hat{E}c$ (on dBm basis) may denote RSRP per RE that is present in a HeNB antenna connector received from a co-channel Wide Area BS (or eNB). For decision of CRS $\hat{E}c$, a cell-specific RS ($R_0$) corresponding to Antenna Port #0 may be used. If the co-channel Wide Area BS (eNB) uses multiple Tx antenna ports, the cell-specific RS ($R_0$) and an average of the CRS $\hat{E}c$ values on all Tx antenna ports may be used as necessary. CRS $\hat{E}c$ may denote CRS power of one eNB detected at the highest power, from among CRSs of a plurality of neighbour eNBs observed by HeNB.

Ioh (on dBm basis) may denote total Tx DL power including all interference, other than a home BS signal that is present in a home BS antenna connector of a home BS operation channel.

Iob (on dBm basis) may denote uplink reception (Rx) interference power including thermal noise contained in a frequency bandwidth of one physical resource block (PRB) present in a home BS antenna connector on a home BS operation channel.

$N_{RB}^{DL}$ is the number of DL resource blocks (RBs) present in a home BS channel.

$N_{SC}^{RB}$ is the number ($N_{SC}^{RB}$=12) of subcarriers contained in one RB.

X is a parameter configured in the network.

In Table 5, input conditions are specified to an antenna connector of a home eNB (HeNB). In addition, an HeNB receiver including diversity may be separately applied to each antenna connector. In addition, output power (Pout) may denote a total sum of Tx power extended to all antennas of the home eNB (HeNB) in association with each Tx power measured at each antenna connector.

In more detail, an upper part of Table 5 shows that the ratio of a CRS power of the neighbor eNB to total power received at a home eNB (HeNB) is relatively low. This means that a small number of eNBs capable of causing high interference to a home eNB (cell) are located in the vicinity of HeNB. This also means that influence of interference applied to a neighbor cell (contiguous cell) is not high due to DL transmission of the home eNB. Accordingly, the home eNB (HeNB) may configure a maximum of output power up to 10 dBm.

A lower part of Table 5 shows that the ratio of CRS power of the neighbor eNB to total power received at a home eNB (HeNB) is relatively high. This means that one or more eNBs capable of causing high interference to a home eNB (cell) are located in the vicinity of HeNB. This also means that influence of interference applied to a neighbor cell (contiguous cell) is high due to DL transmission of the home eNB. Accordingly, the home eNB (HeNB) may coordinate DL Tx power of the home eNB (HeNB) in proportion to a CRS power level of a detected neighbor eNB. For example, if HeNB detects a relatively high interference (CRS power) from a specific eNB, other eNBs (cells) may receive high interference from the corresponding specific eNB (the corresponding CRS Tx eNB). Thus, although HeNB performs DL transmission at high Tx power, low interference applied to other eNBs (cells) may occur, such that the eNB may configure high DL Tx power. In contrast, if HeNB detects a relatively low interference (CRS power) from a specific eNB, other eNBs (cells) may receive low interference from the corresponding specific eNB (the corresponding CRS Tx eNB). Thus, although HeNB performs DL transmission at high Tx power, high interference applied to other eNBs (cells) may occur, such that HeNB may configure low DL Tx power.

As can be seen from FIG. 7, HeNB classifies time and/or frequency resources for DL transmission into a plurality of aggregates, and may configure different DL signal Tx power for each aggregate. For convenience of description, it is assumed that HeNB classifies time and/or frequency resources for DL transmission into downlink time and/or frequency resources and uplink time and/or frequency resources.

First of all, HeNB may use a method for configuring Tx power of Table 5 using DL time and/or frequency resources.

In this case, assuming that a specific resource is specified for DL, this means that the corresponding resource may be understood as a resource for satisfying any one of the following references 1) to 4). In addition, the corresponding resource may also be understood as a resource for simultaneously satisfying a plurality of references.

1) In a first reference (1), a specific resource configured for DL usage may indicate a resource (DL resource) configured as a DL resource according to a resource regulation configured by HeNB. For example, in the TDD system, the specific resource may be a configured subframe of a DL subframe on UL/DL configuration (see Table 1) that is transferred from the corresponding HeNB to a neighbor eNB. In case of the FDD system, the specific resource may be a DL band to be used by the corresponding HeNB.

2) In a second reference (2), a specific resource configured for DL usage may indicate a resource (DL resource) configured as a DL resource according to a resource regulation configured by a contiguous cell. For example, in the TDD system, the specific resource may be a configured subframe of a DL subframe on ULDL configuration (see Table 1) to be used by a contiguous eNB. In case of the FDD system, the specific resource may be a DL band to be used by the corresponding contiguous eNB. In addition, if several neighbor eNBs indicate the use of different UL/DL configurations (see Table 1), the specific resource may be a subframe commonly used for all the neighbor eNBs, or a subframe configured as a common DL subframe in any one subframe.

3) In a third reference (3), a specific resource configured for DL usage may indicate a resource configuration (for example, in case of the TDD system, the resource configuration may indicate a reference UL/DL configuration on the network) to be used as a common reference in the corresponding network to which HeNB belongs, or may indicate a resource configured (designated) as a DL resource on a reference configuration. In this case, the network may also indicate the position of a predetermined DL resource.

4) In a fourth reference (4), a specific resource configured for DL usage may indicate a subframe commonly configured as a DL subframe on all UL/DL configurations. For example, referring back to Table 1, the specific resource may be subframes (SFs #0 and #5 or SFs #0, #1, #5, #6 each including a special subframe in which a downlink reference signal is transmitted) configured as DL subframes on a total of 7 UL/DL configurations decided by the 3GPP LTE system.

HeNB may use the Tx power configuration method of Table 5 using time and/or frequency resources for DL purpose, where the time and/or frequency resources can satisfy one or more of the above-mentioned references.

In order to coordinate DL Tx power on the basis of a DL signal measurement value received from a neighbor eNB in DL resources, each HeNB must measure a DL signal transferred from the neighbor eNB. In this case, if different DL resource configurations are assigned to individual eNBs (cells), it may be difficult to perform such measurement, such that any one of several references is selected (or several references are simultaneously selected) and it can be recognized which resource will be used for downlink. In this case, a resource for measuring DL transmission of a contiguous cell may be identical to a resource for enabling the corresponding HeNB to coordinate DL Tx power. Accordingly, each HeNB may measure a DL signal that is transferred from the neighbor eNB only in a DL resource defined according to a reference selected from among a plurality of references, such that the HeNB may coordinate its own DL Tx power on the basis of the measurement result.

On the other hand, HeNB may configure Tx power using a separate method in UL time and/or frequency resources. For example, if the Tx power configuration method used in time and/or frequency resources dedicated for downlink of Table 5 is equally used, an additional offset may be assigned to the final configuration power, or DL Tx power may be configured using a separate parameter (e.g., Pmin, Pmax, X, etc.) having a different value.

In this case, if a specific resource is configured for UL, this means that the corresponding resource may be understood as a resource for satisfying any one of the following references 1) to 4). In addition, the corresponding resource may also be understood as a resource for simultaneously satisfying a plurality of references.

In addition, similar to the case of downlink, the corresponding resource may be a resource that satisfies any one of the following references. In addition, the above-mentioned condition may also indicate that one or more meanings of the following meanings are simultaneously satisfied.

1) In a first reference (1), a specific resource configured for UL usage may indicate a resource (UL resource) configured as a UL resource according to a resource regulation configured by HeNB. For example, in the TDD system, the specific resource may be a configured subframe of a DL subframe on UL/DL configuration (see Table 1) that is transferred from the corresponding HeNB to a neighbor eNB. In the FDD system, the specific resource may be an uplink (UL) band to be used by the corresponding HeNB.

2) In a second reference (2), a specific resource configured for UL usage may indicate a resource (UL resource) configured as a UL resource according to a resource regulation configured by a contiguous cell. For example, in the TDD system, the specific resource may be a configured subframe of a UL subframe on UL/DL configuration (see Table 1) to be used by a contiguous eNB. In the FDD system, the specific resource may be a UL band to be used by the corresponding contiguous eNB. In addition, if several neighbor eNBs indicate use of different UL/DL configurations (see Table 1), the specific resource may be a subframe commonly used for all the neighbor eNBs, or a subframe configured as a common UL subframe in any one subframe.

3) In a third reference (3), a specific resource configured for UL usage may indicate a resource configuration (for example, in case of the TDD system, the resource configuration may indicate a reference UL/DL configuration on the network) to be used as a common reference in the corresponding network to which HeNB belongs, or may indicate a resource configured (designated) as a UL resource on a reference configuration. In this case, the network may also indicate the position of a predetermined UL resource.

4) In a fourth reference (4), a specific resource configured for UL usage may indicate a subframe commonly configured as a DL subframe on all UL/DL configurations. For example, referring back to Table 1, the specific resource may be subframes (SF #2 may be used, or if the switch-point periodicity of the UL/DL configuration is limited to 5 ms. SFs #2 and #7 may be used) configured as DL subframes on a total of 7 UL/DL configurations decided by the 3GPP LTE system.

Alternatively, HeNB may use a Tx power configuration method different from the above-mentioned method in time and/or frequency resources dedicated for UL purpose. That is, HeNB may coordinate DL Tx power using time and/or frequency resources dedicated for uplink independently of or differently from the method (reference) for coordinating DL Tx power in time and/or frequency resources dedicated for downlink. For example, if HeNB may measure UL interference, and if time and/or frequency resources dedicated for uplink are used for DL purposes according to such interference measurement, an available Tx power level may be decided.

Figure 8:
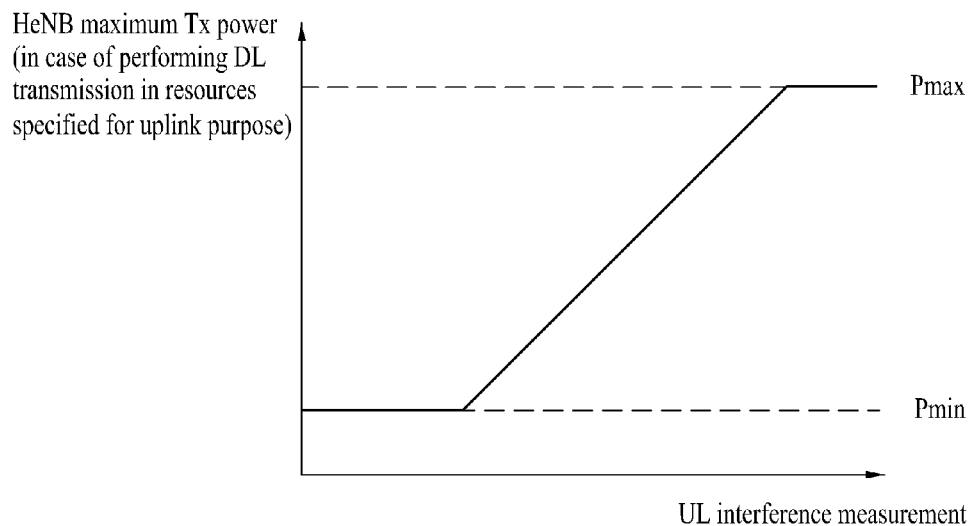
FIG. 8 exemplarily shows the relationship between UL interference measurement and DL Tx power according to embodiments of the present invention.

FIG. 8 exemplarily shows the relationship between UL interference measurement and DL Tx power according to embodiments of the present invention.

Referring to FIG. 8, HeNB may configure DL Tx power in proportion to UL interference measured within a maximum downlink Tx power (Pmax) of HeNB and a minimum DL Tx power (Pmin) of HeNB. In this case, reception of strong UL interference may indicate that UL Tx power of a contiguous cell is high, so that which means that, even when the corresponding HeNB uses high Tx power, the Tx power applied to a contiguous cell is not high. In other words, assuming that a UE of HeNB receives a relatively high interference from a UE of a contiguous cell in which UL transmission is performed, high Tx power of the HeNB is configured and the HeNB transmits a DL signal. Assuming that a DL signal is transmitted due to high Tx power of the HeNB and a UE of the HeNB receives relatively low interference from a UE of a contiguous cell in which UL transmission is performed, low Tx power of the HeNB is configured, so that a downlink (DL) signal can be transmitted.

On the contrary, HeNB may measure UL interference in time and/or frequency resources specified for UL purpose, and may configure DL Tx power in inverse proportion to the measure UL interference. In this case, high UL interference may indicate that a UE of another eNB is located close to the HeNB. If HeNB performs DL transmission with high Tx power, high interference may occur in a UE of another eNB. As a result, a low DL Tx power of the HeNB may be configured to minimize interference applied to the UE of another eNB.

When the above-mentioned operation is performed, the HeNB must measure UL interference using appropriate resources. In this case, the present invention may measure UL interference in a resource specified for UL purposes or in a DL-specified resource defined according to a reference selected from among a plurality of references specified for DL purposes.

3. General Apparatus Applicable to the Present Invention

Figure 9:
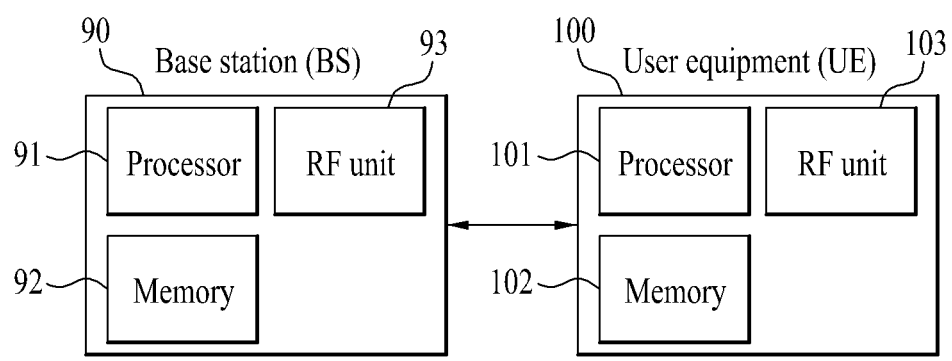
FIG. 9 is a block diagram illustrating a wireless communication apparatus according to an embodiment of the present invention.

FIG. 9 is a block diagram illustrating a wireless communication apparatus according to an embodiment of the present invention.

Referring to FIG. 9, the wireless communication system includes a base station (BS) 90 and a plurality of UEs 100 located in the BS region 90.

The BS 90 includes a processor 91, a memory 92, and a radio frequency (RF) unit 93. The processor 91 may be constructed to implement the procedures and/or methods disclosed in the embodiments of the present invention. Layers of the radio interface protocol may be implemented by the processor 91. The memory 92 may be connected to the processor 91, and store various information related to operations of the processor 91. The RF unit 93 is connected to the processor 91, and transmits and/or receives RF signals.

The UE 100 includes a processor 101, a memory 102, and an RF unit 103. The processor 101 may be constructed to implement the procedures and/or methods disclosed in the embodiments of the present invention. Layers of the radio interface protocol may be implemented by the processor 101. The memory 102 may be connected to the processor 101, and store various information related to operations of the processor 101. The RF unit 103 is connected to the processor 101, and transmits and/or receives RF signals.

The memory 92 or 102 may be located inside or outside the processor 91 or 101, and may be connected to the processor 91 or 101 through various well known means. In addition, the BS 90 and/or the UE 100 may have a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

As is apparent from the above description, although the method for transmitting and receiving data in a wireless access system according to the embodiments of the present invention has been disclosed only on the basis of 3GPP LTE, it should be noted that the embodiments are also applicable not only to 3GPP LTE but also to other wireless access systems.

The invention claimed is:

1. A method for configuring downlink transmit power by a base station (BS) in a wireless access system supporting an environment in which the amount of uplink (UL) resources and the amount of downlink (DL) resources are dynamically changed, the method comprising:
    classifying a resource region to be used for downlink transmission into a plurality of resource sets to discriminate a first resource set or a second resource set, wherein the first resource set includes a downlink subframe configured on an uplink-downlink configuration of the BS, and the second resource set includes uplink subframes which are reconfigured as downlink subframes according to an amount of traffic;
    measuring an interference with a neighbor cell at each of the plurality of resource sets;
    configuring different downlink transmit (Tx) powers for the each of the plurality of resource sets, according to whether the neighbor cell performs an uplink transmission or a downlink transmission,
    wherein downlink transmit (Tx) power for the first resource set is configured to be proportional to a power level of a common reference signal (CRS) transmitted from a neighbor base station (BS), and
    wherein downlink transmit (Tx) power for the second resource set is configured by assigning an offset to the downlink transmit (Tx) power of the first resource set; and
    transmitting, to a user equipment (UE) a downlink signal at the configured downlink transmit (Tx) power.

2. The method according to claim 1, further comprising:
    transmitting information that includes at least one of an indicator indicating a usage of each resource, transmit (Tx) power level information used by each resource, and maximum transmit (Tx) level information available in each resource, to the neighbor base station (BS).

3. The method according to claim 2, wherein the transmit (Tx) power level information used in each resource is comprised of different Relative Narrow band Transmission Power (RNTP) indicators and different RNTP threshold values for individual classified aggregates.

4. The method according to claim 1,
wherein the first resource set is any one of a downlink resource configured by a resource regulator of the base station (BS), a downlink resource configured by a resource regulation of the neighbor base station (BS), a downlink resource configured by a network including the base station (BS), and a subframe commonly specified for downlink on Time Division Duplex (TDD) unlink/downlink (UL/DL) configuration.

5. A base station (BS) for configuring downlink transmit (Tx) power in a wireless access system supporting an environment in which the amount of uplink (UL) resources and the amount of downlink (DL) resources are dynamically changed, the base station (BS) comprising:
a processor; and
a radio frequency (RF) unit connected with the processor to transmit a radio frequency (RF) signal,
wherein the processor is configured to:
classify a resource region to be used for downlink transmission into a plurality of resource sets to discriminate a first resource set or a second resource set, wherein the first resource set includes a downlink subframe configured on an uplink-downlink configuration of the BS, and the second resource set includes uplink subframes which are reconfigured as downlink subframes according to an amount of traffic,
measure an interference with a neighbor cell at each of the plurality of resource sets,
configure different downlink transmit (Tx) powers for the each of the plurality of resource sets, according to whether the neighbor cell performs an uplink transmission or a downlink transmission,
wherein downlink transmit (Tx) power for the first resource set is configured to be proportional to a power level of a common reference signal (CRS) transmitted from a neighbor base station (BS), and
wherein downlink transmit (Tx) power for the second resource set is configured by assigning an offset to the downlink transmit (Tx) power of the first resource set, and
transmit, to a user equipment (UE) a downlink signal at the configured downlink transmit (Tx) power.

6. The base station (BS) according to claim 5, wherein the processor transmits information that includes at least one of an indicator indicating a usage of each resource, transmit (Tx) power level information used by each resource, and maximum transmit (Tx) level information available in each resource, to the neighbor base station (BS).

7. The base station (BS) according to claim 6, wherein the transmit (Tx) power level information used in each resource is comprised of different Relative Narrow band Transmission Power (RNTP) indicators and different RNTP threshold values for individual classified aggregates.

8. The base station (BS) according to claim 5,
wherein the first resource set is any one of a downlink resource configured by a resource regulation of the base station (BS), a downlink resource configured by a resource regulation of the neighbor base station (BS), a downlink resource configured by a network including the base station (BS), and a subframe commonly specified for downlink on Time Division Duplex (TDD) uplink/downlink (UL/DL) configuration.

* * * * *